United States Patent [19]

Tringali et al.

[11] 3,836,915

[45] Sept. 17, 1974

[54] TIME RECORDER

[75] Inventors: Dominick Tringali; John W. Dillard, both of Columbia, S.C.

[73] Assignee: Universal Business Machines, Incorporated, Columbia, S.C.

[22] Filed: July 16, 1973

[21] Appl. No.: 379,492

Related U.S. Application Data

[62] Division of Ser. No. 239,124, March 29, 1972, Pat. No. 3,743,641.

[52] U.S. Cl. .............................................. 346/104
[51] Int. Cl. ........................ G01d 15/28, G07c 1/18
[58] Field of Search ........... 346/104, 79, 82, 83, 89, 346/90, 141

[56] References Cited

UNITED STATES PATENTS 843,170 2/1907 Palmer et al. ......................... 346/79
3,638,233 1/1972 Futter ................................. 346/82

*Primary Examiner*—Joseph W. Hartary
*Attorney, Agent, or Firm*—Kemon, Palmer & Estabrook

[57] ABSTRACT

A recorder for automatically printing a record receiver, such as a card, with actual time and elapsed time. The recorder includes a chute assembly with cooperating electronic elements for automatically positioning a card therein prior to selectively operating a print actuator assembly. The record receiver is initially positioned in said chute assembly by a manual effort and then drawn completely into said chute by automatically actuated gripping means whereby printing members impart a recording upon said record receiver. The chute assembly is provided with a mechanism to effect automatic ejection of the card subsequent to said recording operation.

12 Claims, 19 Drawing Figures

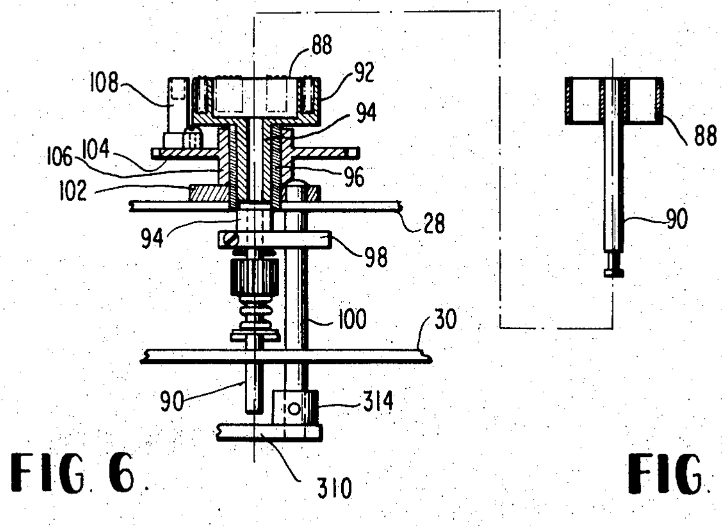
FIG. 6, FIG. 6b
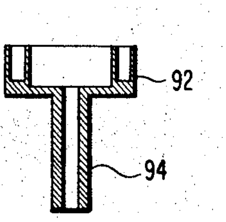
FIG. 6c
FIG. 6e
FIG. 6f
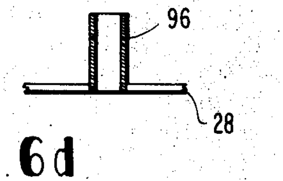
FIG. 6d
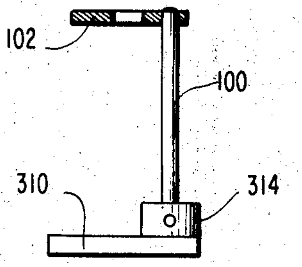
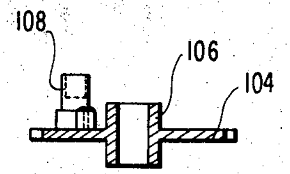
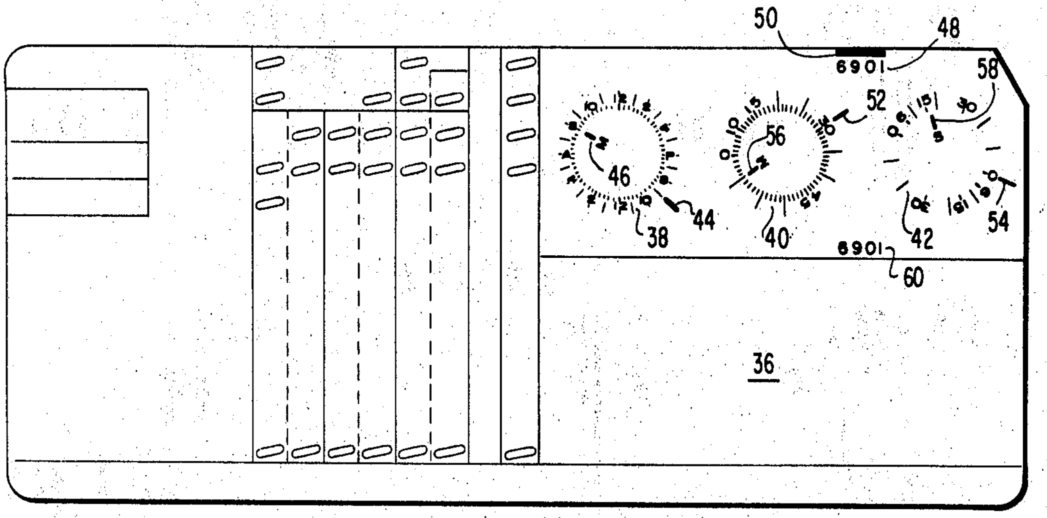
FIG. 7

TIME RECORDER

This is a Divisional Application of Ser. No. 239,124 filed Mar. 29, 1972, now U.S. Pat. No. 3,793,641.

THE BACKGROUND OF THE INVENTION

The invention relates to recorders of the type employed to produce elapsed time records on cards or other record receivers.

Elapsed time recorders have been known to the art since at least the latter part of the 19th Century as is evidenced by the U.S. Pat. Nos. to H. Abbott, 449,192; 583,320; and 772,308. These patents and later issued ones such as U.S. Nos. RE 13,597; 1,582,651; 2,259,677; and 2,796,315, all appear to generally deal with an elapsed time recorder of a type known as the "Calculagraph" (Registered trademark of the Calculagraph Co., of Harrison, New Jersey). The said recorder has been used, almost exclusively, by the telephone operating companies of the Bell Telephone System for about the past half century.

The said recorder is provided with mechanical elements for recording the time of day, elapsed time in minutes and seconds, and other matter on toll cards which are used for accounting purposes by telephone operating companies. To accomplish these functions, a printing assembly in the recorder is time driven by a clockworks. The printing assembly is provided with lift shafts that extend from said assembly through the clockworks and which are mechanically linked to mechanical lifting elements. The lifting elements are interconnected by mechanical linkages with a pair of operating levers that are located outside of the recorder's casing.

In use, a telephone company employee, upon the commencement of a toll call, manually positions a toll card relative to the printing assembly, and operates one of the two levers to effect a printing on the card which depicts usually by means of a suitable mark upon a printed dial the time of day as well as a mark on an elapsed minutes dial and an elapsed seconds dial. The card may then be manually removed from the recorder. Thereafter and upon completion of the call, the card is reinserted by the employee and the second operating lever is pulled to imprint suitable marks, such as arrows or the like, at least upon the elapsed minutes and elapsed seconds dials on the toll card.

Thus, it becomes readily apparent that, with "Calculagraph" type of recorders, the control is completely with the operator, and therefore, subject to human error. For example, the operator may err by simply pulling the wrong operating lever. Although only two levers are involved, it will be seen that the operator can err by:

1. pulling the first lever twice;
2. pulling the second lever twice;
3. pulling the first lever for a second printing operation; and
4. pulling the second lever for a first printing operation.

This type of error can and does result in significant annual revenue loss to the telephone operating companies.

It is also possible for the operator to produce an erroneous record in that the toll card must be positioned relative to the printing assembly for each recording operation. Even assuming the card is presented with the correct orientation, it is possible that the card will not be positioned during the second printing operation precisely as it was during the first operation. In such event, the elapsed time indicators probably will not be properly located within the elapsed time dials. Such improper recordings can and do result in revenue losses.

Finally, the said prior art recorders result in operating losses in that they are slow acting by virtue of their mechanical construction. This type of loss may be characterized as a man hours loss for the reason that time spent to supply the energy to operate the mechanical elements represents a time loss for the operation of a switchboard. In addition, the energy loss contributes to operator fatigue.

The skilled artisians working in the art have tried to overcome some of the problems set out above. For example, recorders have been provided with means for notching a card during a first printing operation. Other means are provided to sense the presence of the notch during a second printing operation to thereby prevent operation of the elements used during the first printing. In addition, the art has substituted solenoids as the actuators. However, such substitution is usually a complete substitution such that the solenoids must be energized throughout a printing operation. Prolonged energization results in unacceptable and expensive power drams in installations such as those employed by the telephone companies. Thus up to the present time, recorders of the type described have not been changed significantly. In this regard, see U.S. Pat. No. 3,409,903.

SUMMARY OF THE INVENTION

The present invention is directed to a time recorder that is capable of automatically providing recordings of elapsed time.

It is an object of this invention to provide a new and useful time recorder having means which are responsive to a condition of a record receiver for electronically effecting a printing operation on the receiver with a minimum dissipation of power.

It is another object of this invention to provide a new and useful automatically operable electromechanical apparatus for a time recorder.

It is an additional object of this invention to provide a new and useful card chute assembly provided with means for precisely positioning a card in a time recorder.

It is an object of this invention to provide a novel electronically operated mechanical print element lifting assembly for a time recorder.

It is another object of this invention to provide a new and useful time recorder having novel electronic means for controlling the recorder to selectively effect a first or second printing on a record receiver.

These and other objects of the invention should become more readily apparent with a study of the hereinafter described specific embodiment of the invention; the study being made with references to the following drawings.

BRIEF DESCRIPTION OF THE DRAWINGS

FIG. 6 is a detailed view in front elevation of time of day printing members and lifting elements for said members;

FIGS. 6*b* through 6*f* are elevational views of certain of the elements shown in FIG. 6;

FIG. 7 is a view of one side of a typical twice printed record receiver produced by a time recorder of this invention;

DESCRIPTION OF PREFERRED EMBODIMENT

Figure 1:
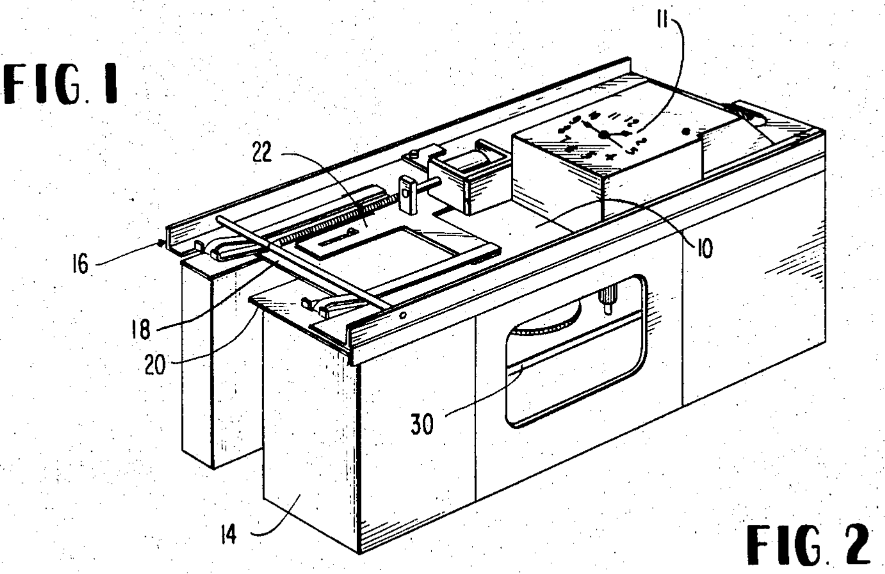
FIG. 1 is a pictorial view of the recorder of the invention as seen in elevation and without protective covers.

A specific embodiment of a time recorder constructed in accordance with the invention is shown pictorially in FIG. 1 of the drawings. The recorder is shown without a protective casing in order that its electro-mechanical features may be shown in general and in assembled form. The recorder includes a clock dial 11 supported and carried by a top casting or member 10, with said dial having an hour hand and a minutes hand. The timing hands are turned by gears extending from a clockworks 12 that is suitably mounted within a main support frame or member 14. When the recorder is provided with a protective casing, the clock dial is visible externally thereof.

The items described thus far are essentially the same items found in the "Calculagraph" employed by the operating companies of the Bell Telephone System. The main support frame or member 14 has been machined differently to accommodate the parts of the present invention. In addition, it is used to support printed circuit component boards, not shown, which are utilized to provide circuit connections and to support circuit components of at least parts of the electronics discussed hereinafter.

Figure 8:
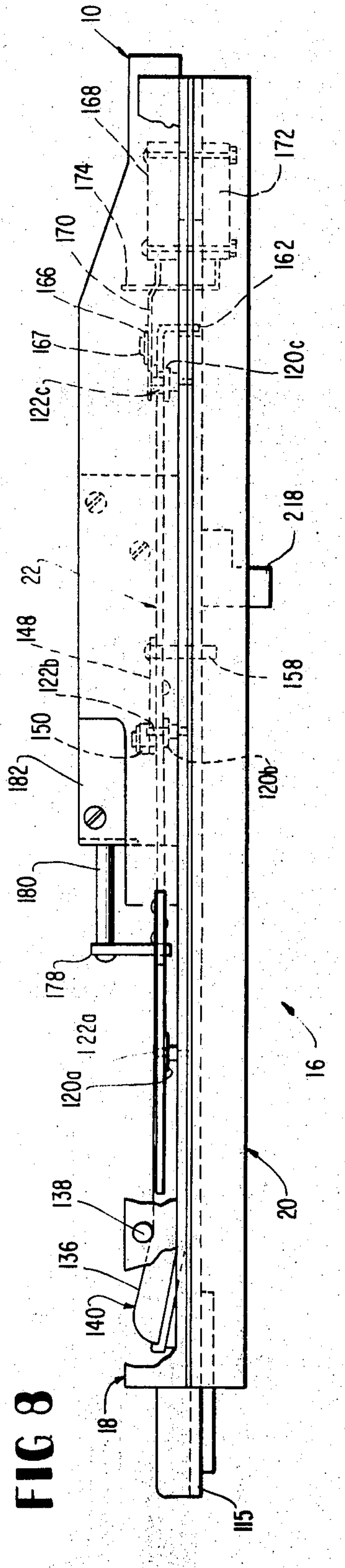
FIG. 8 is a side elevation of a card chute assembly usable with the recorder of this invention.
Figure 9:
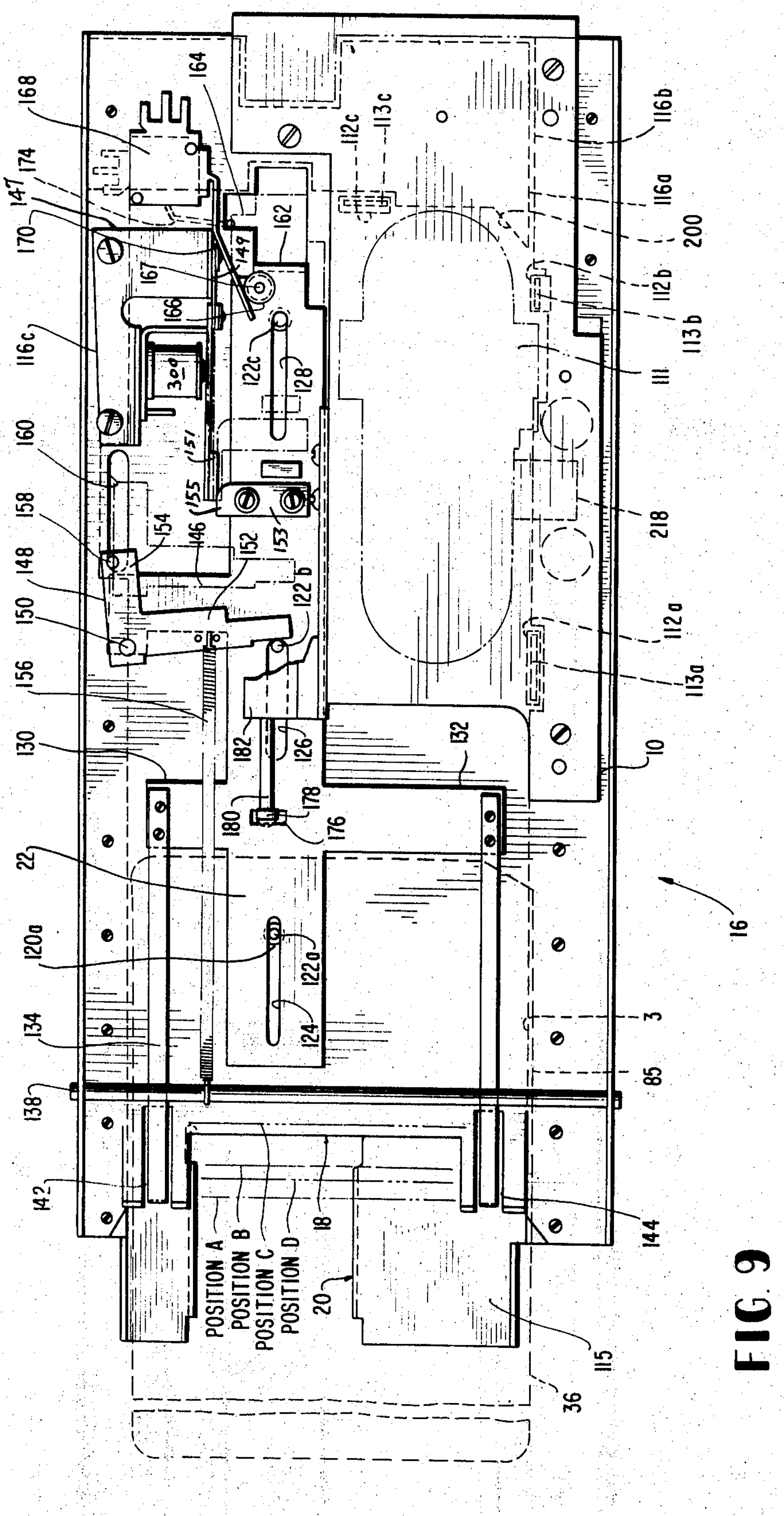
FIG. 9 is a plan view of the assembly shown in FIG. 8.

As shown in FIGS. 1 and 9, a card chute assembly 16 is fastened to the member 10 by suitable means such as screws. The details of construction of the card chute assembly and its functional interrelationship will be discussed below with respect to FIGS. 8 – 10. Generally speaking, the card chute assembly comprises an upper card plate 18 and a lower card plate 20 which are secured together in spaced apart relationship and a card retract slide 22 with cooperating elements. The card chute assembly constitutes an important part of the present invention in that it functions inter alia to accept a card from an operator, and to automatically remove the card from operator control such that a printing operation may be performed on the card. When the recorder is fully assembled, the protective casing, member 10, and card chute assembly may be secured together by suitable means to form a top assembly. The assembly thus formed may then be secured to the main support member 14 by screws such that it can be conveniently removed for such servicing as may be desired.

Figure 2:
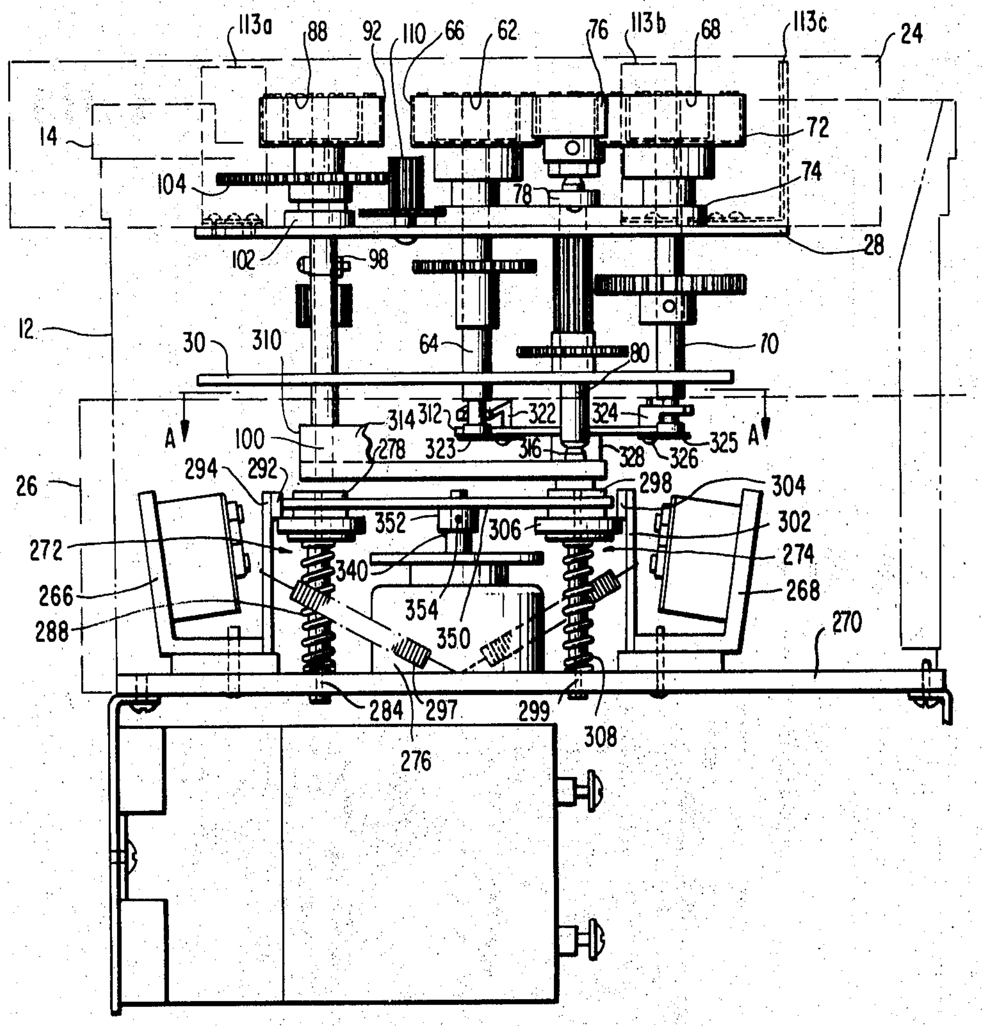
FIG. 2 is a side elevation of the printing clockworks and print actuating assemblies of the invention.

Two other main assemblies are shown in FIG. 2. A printing assembly 24 is located immediately above the clockworks 12. The printing assembly will be described in detail below with reference to FIGS. 2–7, and it essentially comprises a number of printing heads mounted and supported for axial movement through the lower card plate 20. The printing assembly differs from that used in the "Calculagraph" in that the prints made on a record receiver such as a card, are susceptible to machine reading by a scanning device of the type described and claimed in a co-pending application of Dominick Tringali, Ser. No. 44,741, filed June 9, 1970., and assigned to the assignee of the present invention. The printing heads are similar to those of the "Calculagraph" in the sense that the recordings produced are humanly readable, as well as machine readable. As with the "Calculagraph" the print heads are mounted on shafts that extend through the clockworks 12 to shaft actuators. In the "Calculagraph," the shaft actuators comprise manually operated mechanical elements arranged to provide selective axial motion to the shafts. In the recorder of the present invention, an electro-mechanical print actuator assembly 26, FIG. 2, is employed to perform the functions of the mechanical assemblies in the "Calculagraph." The print actuator assembly of the recorder of the present invention is operated electronically in cooperation with the movement of a card in the card chute assembly; the details of such operation and of the construction of the print actuator assembly are given below.

Figure 3:
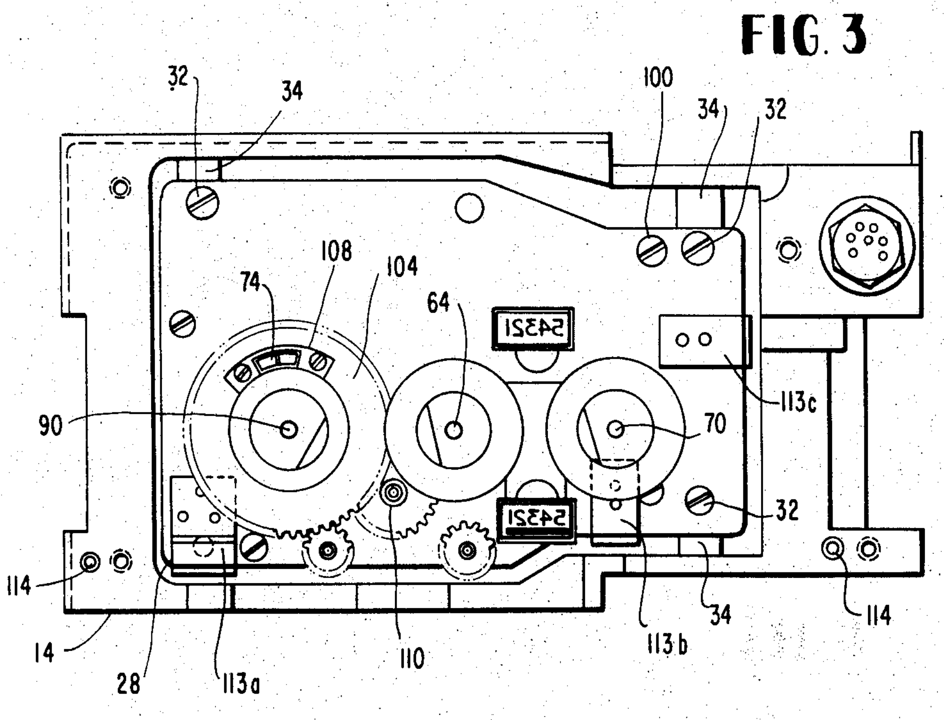
FIG. 3 is a plan view of the printing assembly shown mounted in a support member.

The printing assembly 24, clockworks 12, and print actuator assembly 26 are shown mounted within and to the main support 14 in FIGS. 2 and 3 of the drawings. The clockworks, which may comprise in general the same gear assembly employed in the "Calculagraph," with one variation to be mentioned later, is supported by the usual upper and lower register plates 28 and 30. The assembly 24 is carried by the plate 28 which is connected to the brackets 34 by the screws 32, as best seen in FIGS. 2 and 3 and in detail in FIGS. 4–6. As stated previously, the print heads differ from the "Calculagraph" heads in that the record obtained is both machine and humanly readable. To this end, the printing dies employed are provided with type that will print sharply defined bars to provide record indications of hours and minutes and elapsed minutes and elapsed seconds relative to three clock dials.

A completed recording made on the so-called front face of a card 36 is shown in FIG. 7 where the time of day is shown relative to a dial 38, while elapsed minutes and elapsed seconds are respectively shown related to dials 40 and 42. The three dials are printed along with an hours indicator 44 and a minutes indicator 46 during a first printing operation. In addition, an identification number 48 and a black bar 50 are printed at the top edge of the card 36 approximately between the dials 40 and 42 during the first printing operation. The bar 50 is printed on the card for the purpose of generating a signal for the electronics of the recorder of the present invention as will be discussed below.

The die used for printing the dial 40 includes type or its equivalent for printing a reference mark 52 adjacent the 30-minute calibration line. Similarly, the die for printing the dial 42 includes type for printing a reference mark 54 adjacent one of the two zero calibration lines on the dial; the dial is a 120 second dial. It was mentioned above that the clock gears in the clockworks differ from the "Calculagraph's" clockworks in one particular. Specifically, the seconds gear rotates at one-half revolution per minute or such that it makes one-half revolutions per minute. This change is deemed important for it increases the resolution of the elapsed minutes recording that may be obtained both visually and automatically by a machine. Specifically, during a second printing operation, an elapsed minutes indicator 56 is printed within the dial 40, and an elapsed seconds indicator 58 is printed within the dial 42. In the event that the elapsed minutes value is an even value, i.e., 0,2,4, etc., the seconds indicator should be located relative to the first 60 seconds of the dial 42. The first 60 seconds may be counted clockwise from the zero indicator not adjacent the reference indicator 54. Similarly, if the elapsed minutes value is odd, i.e., 1,3,5, etc., the indicator 58 should be located relative to the last half of the dial 42. The resolution obtained is important particularly if elapsed time is used for accounting purposes. Error can occur in the elapsed minutes recording by virtue of gear backlash in the clockworks and for similar mechanical factors. Electronic means may be utilized for automatically cross comparing the two recordings to correct for such error. Finally, during the second printing operation, a second identification number 60 is printed. As with the first such printing, the record 60 is made between the dials 40 and 42, however, it is made approximately near the longitudinal center of the card 36. This number should be the same identification number as the number 48; if it is not, then the card has been recorded with an erroneous value of elapsed time.

Figure 4:
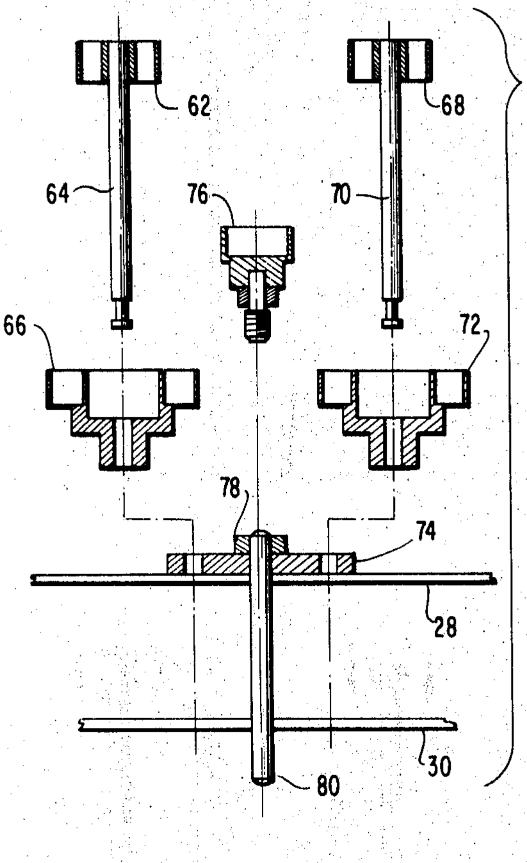
FIG. 4 is a detail view in side elevation of elapsed time printing members used in the printing assembly of FIG. 2.
Figure 5:
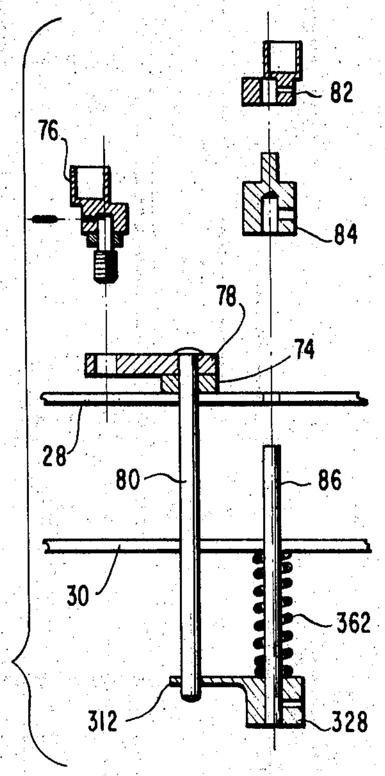
FIG. 5 is a detailed view in front elevation of identification number printing members and lifting elements for said members.

Referring to FIGS. 2, 4 and 5, the elapsed minutes indicator print die is supported within a container 62. The die, as with all the print dies referred to hereinafter, may be of the ink transfer type as manufactured and sold by the National Cash Register Company. Alternatively, the dies may conveniently be pads made out of ink pad material. In either case, such dies are preferred over metallic dies in that either type eliminates the need for an ink ribbon and a ribbon transfer or advance mechanism. The pad container 62 is fixedly attached to one end of a minutes shaft 64 and it is dimensioned such that it is normally seated within a second pad container 66. The container 66 comprises a support for the printing die used to produce the dial 40 and the reference indicator 52. A third pad container 68 is attached to one end of a seconds shaft 70, and it is dimensioned such that it is normally seated within a fourth pad container 72. The containers 68 and 72 respectively support the ink pads used to produce the elapsed seconds indicator 58 and the dial 42 with reference indicator 54. The elapsed time dial pad containers 66 and 72 are respectively keyed to the containers 62 and 68 such that the containers may be rotated by the respective shafts 64 and 70. The keying and construction are such that the containers 66 and 62 may be moved in the axial direction of the shaft 64 relative to each other. The same type of keying and construction is employed for the containers 68 and 72. The containers 66 and 72 are normally seated on a lift plate 74. The shafts 64 and 70 extend through the respective containers and through spaced apart clearance holes in the lift plate 74. In addition, the shafts extend through the clockworks plates 28 and 30, and are respectively engaged by the clockworks' gearing to turn the container 62 at a minutes rate and the container 68 at one half of a seconds rate. A pad container 76 for supporting an ink pad capable of producing the identification number 48 and bar 50 is carried by a bracket 78 which is mounted on and secured to the plate 74 by a lift shaft 80. The shaft is so affixed to the lift plate that movement of the shaft in one direction along its axis is effective to lift both the plate 74 and bracket 78 and thereby effect movement of the containers 66, 72 and 76. The shaft 80 extends through the clockwork plates 28 and 30, but unlike the shafts 64 and 70, it is not engaged by the clockworks. As shown in FIG. 5, a second identification number print pad container 82 is supported in spaced relation to the first such container 76 by a lift member 84, which is provided with a cavity or recess for receiving one end of a lift shaft 86. The shaft 86 may conveniently be locked to the container by any suitable means such as a set screw. The member 84 is normally supported on the top plate 28 of the clockworks, while the lift shaft extends through the bottom plate 30.

The time of day portion of the printing assembly is best seen in FIGS. 2, 3 and 6. A minutes print pad container 88 is supported by a shaft 90 for rotation within a cavity in a second container 92, which has a depending hollow tubular portion 94 that in turn extends through a collar 96 mounted on the plate 28. The shaft 90 extends through the portion 94 and collar 96 as well as the plates 28 and 30, and is engaged by the clockworks to rotate the container 88 at a minutes rate. The container 92 is used to support a print pad for producing the dial 38 (FIG. 7), while the tubular portion 94 is secured against rotation by a clamp 98 attached to a non-rotating lift shaft 100. The lift shaft 100 extends through the plates 28 and 30 and terminates in a lift bracket 102 that is supported on top of the plate 28 with said bracket having a clearance hole for the collar 96. A gear 104 with a hub 106 that encompasses the collar 96 is supported by the bracket for rotative movement with respect thereto. The gear 104, in turn, is used to support a print pad container 108 on its upper surface and near its outer periphery, i.e., just outside of the container 92. This last noted container supports the print pad for marking the hours indication 44 (FIG. 7). The gear 104 is engaged and rotated at the rate of one revolution per 24 hours by a pinion 110, FIG. 2, where the pinion is provided with an extension into and in engagement with the clockworks. The description thus far has dealt with a time printing assembly and clockworks that is generally known. Changes from and improvements in the known assembly were noted. The description that follows deals with the major assemblies and circuits of the present invention.

THE CARD CHUTE ASSEMBLY

It is the function of the card chute assembly to accept a card from an operator, to remove the card from the operator's control, to automatically position the card for a printing operation, and to thereafter eject the card from the recorder. Electronic triggering and print operation selection means are operatively associated with the card chute assembly and operate as hereinafter described.

As noted above, the card chute assembly 16 includes an upper card plate 18 and a lower plate 20. The details of the assembly, the plates and other apparatus may be best viewed in FIGS. 8 through 10. Each of the plates 18 and 20 is shaped and provided with slots and holes as hereinafter discussed. The plates may be provided with upwardly directed and downwardly directed side flanges respectively if desired to thereby provide additional area for mounting electrical components. The lower plate 20 is provided with a slotted shaped area 111, FIG. 9, into which the printing assembly 24 extends. In addition, both of the plates 18 and 20 are slotted at locations 112*a* and 112*b* along one side and at a right hand end location 112*c* to receive card guides 113*a*, 113*b*, and 113*c*. The guides are, in the preferred embodiment, mounted on the upper plate 28 of the clockworks (FIGS. 2 and 3) and extend upwardly through the respective slots in the plates 18 and 20. In addition, the plates 18 and 20 may be provided with a sufficient number of clearance holes to receive guide pins 114, FIG. 3, mounted on the upper surface of the main support member 14. As will be seen hereinafter the location of such pins is not critical to the operation of the recorder in that the guides 113*a* through 113*c* are employed for positioning a card relative to the printing assembly. The guide pins 114 may be employed to facilitate the assembly of the card chute assembly with the main support member. The plate 20 is also provided at one end with a card receiving shelf 115.

Figure 10A:
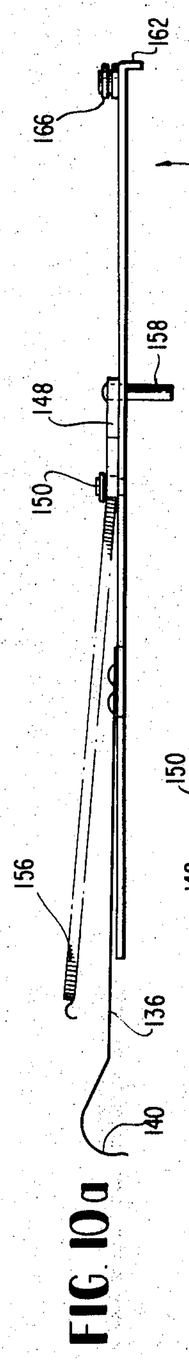
FIGS. 10*a* and 10*b* are side and plan elevations respectively of a card slide usable in the assembly of FIG. 8.
Figure 10B:
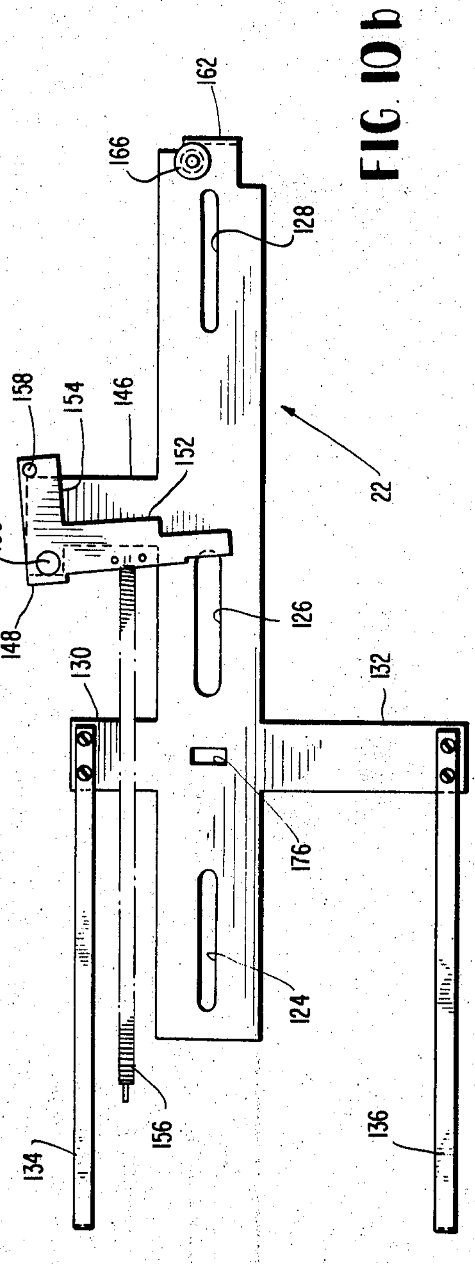

As shown in FIGS. 8 and 9, the card chute plates 18 and 20 are secured together in spaced relation by any suitable means, not shown, with the spacing being determined by a plurality of shim members 116*a*, 116*b*, and 116*c* that are interposed between the plates. The shims should be of sufficient thickness to allow the card 36 to be easily inserted into the space between the plates, and the shims should be dimensioned to allow all around clearance for the cards. A card slide 22 shown in detail in FIGS. 10*a* and 10*b*, is mounted for reciprocating motion above the upper surface of plate 18 on three bearing surfaces. The bearing surfaces may be provided by annuluses 120*a*, 120*b*, and 120*c* supported on guide pins secured in the plate 18, where the pins are provided with projections 122*a*, 122*b*, and 122*c* that extend into slots 124, 126, and 128 respectively in the slide 22. The bearing surface portions of the annuluses are preferably of small area so as to minimize friction.

For the purpose of this description, the left hand portion of the slide as viewed in the drawings will be termed the front part. This terminology is adopted for the reason that such portions extend in the direction of the card input. The slide is provided with arms 130 and 132 extending laterally of front-center, where each arm supports a forwardly extending leaf spring 134 and 136 respectively, at its terminal portion. Each of the springs passes under a cam bar 138 supported by upwardly extending side flanges of the plate 18. The springs are further provided with hooked end portions 140 that extend over grooves 142 and 144, FIG. 9, located in the plates 18 and 20 at the front portion thereof. When the slide is located in its forward position, as shown in FIGS. 8 and 9, the hooked end portions 140 are clear of the opening to the cavity between the plates 18 and 20. A third laterally extending arm 146 is located at the center-rear portion of the slide 22 and is used to support a card positioning operator 148 that is pivotally mounted, by a pin 150, upon the upper surface of the arm 146. The operator 148 may have an L-shaped configuration embodying a longer leg 152 and a shorter leg 154. In the preferred embodiment, the slide 22 is held in the forward position by a slide return spring 156 that is attached to the cam bar 138 and the leg 152 of the operator 148. The short leg of the operator is used to support, on its lower surface, a card seating pin 158. The pin 158 projects downwardly from the leg 154 and through a slot 160 in the plates 18 and 20. When the slide is in the above mentioned position, the long leg 152 engages the guide pin 122b to bias the card seating pin 158 counterclockwise out of the card insertion area between the plates 18 and 20.

The upper plate 18 adjacent the slot 160, FIG. 9, has mounted thereon an angle bracket or support member 147 which has affixed thereto one end of a flat spring 149. The free end of the spring 149 carries a trigger assembly that includes a protruding segment or sear 151 which is designed to engage a latch member 153 that is secured to the card slide 22 adjacent the forward end of the slot 128. The latch member 153 is mounted upon the slide 22 so that an end portion 155 projects beyond the side of said slide 22. The end portion 155 of the latch member 153 is formed with a flat forward edge or surface which is engaged by the rear or trailing edge of the sear 151 so as to retain the slide 22 in its retracted or card inserting position. The rear edge or surface of the projecting end portion 155 of the latch member 153 is rounded or curved to facilitate the movement or passage of the latch member along the lower or bottom surface of the sear 151. The spring 149 continuously urges the protruding segment or sear 151 into engagement with the projecting end portion 155 of the latch member while a coil 300 mounted on the bracket 147 will, upon being energized, attract the spring 149 and trigger assembly. This action by the coil will cause the sear 151 to be withdrawn from engagement with the forward edge of the latch member 153 and thus release the card slide 22 whereby it may be returned to its initial or starting position by the spring 156.

At its rearward end, the slide 22 is provided with a depending arm 162. The said arm extends into a cavity 164 created by slotting the plates 18 and 20, and when the slide is in its forward position, the arm 162 is located at the front end of the cavity. The rear end portion of the slide 22 carries a switch operator 166 that is rotatably supported on a pin 167 adjacent the depending arm 162. A card seating switch 168, FIG. 9, may be supported by the plate 18 such that a movable contactor 170 engages the operator 166. A card print switch 172, FIG. 8, may be supported by the lower plate 20. In the preferred embodiment, a movable contactor 174 for the print switch 172 extends into the cavity 164 at a location spaced rearwardly of the downwardly projecting arm 162 of the slide 118. Finally, the card slide 22 has formed in the forward portion thereof between the arms 130 and 132 a slot 176 which receives a slide operator 178. The slide operator 178 is designed to have a loose fit in the slot 176 when in an inoperative condition and said operator is carried by a movable armature 180 of a card seating solenoid 182.

OPERATIONAL DESCRIPTION INCLUDING THE PRINT ACTUATOR ASSEMBLY

In operation, the card 36 is placed face down on the shelf 115 and inserted by an operator into the opening defined by the plates 18 and 20 until it engages the depending arm 162 at the end of the slide 22. At this point in operation, the trailing edge of the card will be located approximately one-half inch (position A in FIG. 9) from the opening between the plates. As the operator continues insertion of the card, the slide 22 will be moved in a rearward direction against the force of the slide return spring 156. As a result of such movement, the card springs 134 and 136 mounted on the arms 130 and 132 respectively of the slide are gradually cammed down by the cam bar 138 such that their hooked end portions 140 are positioned in non-touching relation behind the trailing edge of the card. Movement of the slide 22 in the rearward direction also causes the card positioning operator 148 to be pulled by the spring 156 in a clockwise direction about its pivot pin 150. The card seating pin 158 mounted on the underside of the leg 154 of the operator 150 is rotated clockwise such that it engages a side edge of the card 36. The amount of rotation within the slot 160 is such that the card seating pin 158 urges the opposite side of the card 36 firmly against the card guides 113a and 113b.

Figure 11:
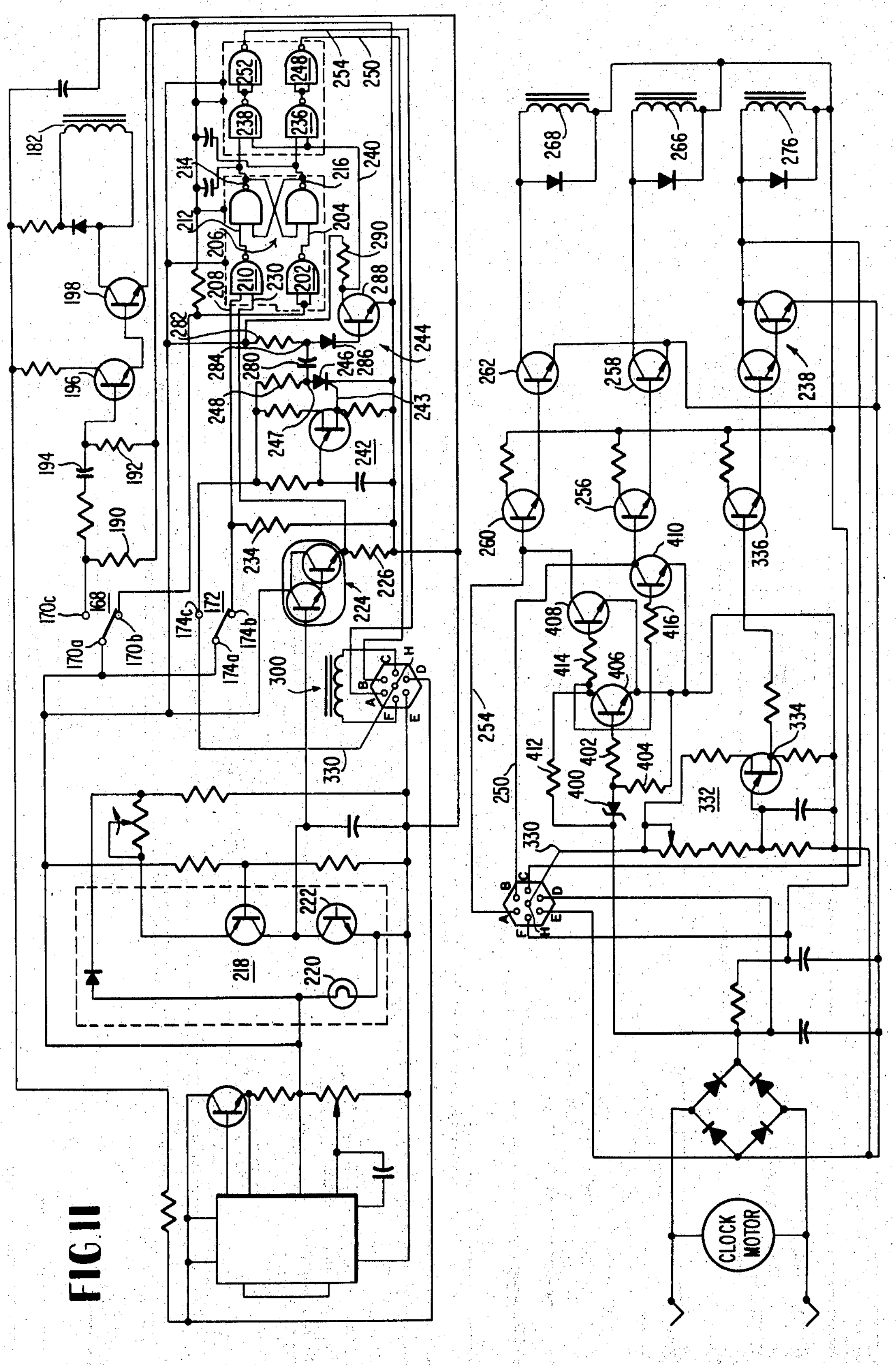
FIG. 11 is a schematic-logic diagram of the electronics used in the recorder of the invention.

Movement of the slide 22 in the rearward direction also causes the rotary switch operator 166 to disengage from the movable contactor 170 of the card seating switch 168 thereby causing the contactor 170 to break connection with a stationary terminal 170*b* and make electrical connection with a second stationary terminal 170*c*; see FIG. 11. The switch is operated in the preferred embodiment when the trailing edge of the card is approximately one-quarter inch from the chute assembly opening, i.e., at position B in FIG. 9. The contactor 170 is connected to a regulated source of d.c. voltage such that operation of the switch 168 places the terminal 170*c* at the source level. The terminal 170*c* is connected to a pulse forming timing circuit 190 comprised of three resistors and a capacitor, at least one of the resistors 192 and a capacitor 194 forming a differentiator circuit having its output connected to the base electrode of a transistor 196. The emitter electrode of the transistor 196 is connected directly to the base electrode of a second transistor 198 which has the card seating solenoid 182 connected to its collector as a load. So long as the contactor 170 makes with the stationery contact 170*b* the transistors 196 and 198 are non-conducting such that the card seating solenoid 182 is unenergized. When the contactor 170 makes with the terminal 170*c*, a pulse is formed by the circuit 190 and applied to the base of the transistor 196 causing the said transistor to current saturate and thereby cause the transistor 198 to break into conduction. With the transistor 198 conducting the card seating solenoid 182 is energized to effect movement of its armature (see FIGS. 8 and 9) in a rearward direction. With such operation, the slide operator 178 is carried by the armature in a rearward direction to thereby power the slide 22 rearwardly.

As the slide 22 continues to travel in the rearward direction, the hooked end portions 140 of the springs 134 and 136 engage the trailing edge of the card to carry or propel the card into the recorder completely out of reach of the individual who initially inserted the card for recording. In the preferred embodiment, the trailing edge is located approximately one-tenth of an inch into the area between the plates 18 and 20, or that is, at position C in FIG. 9 of the drawings. When the card is located as described, its leading edge is lodged firmly against the front end card guide 113*c* and, as previously noted, the movement of the card seating pin was effective to lodge a side edge of the card 36 against the guides 113*a* and 113*b*. The rearward movement of the slide 22 causes the curved surface of the projecting end portion 155 of the latch member 153 to move under the trigger assembly so that the sear 151 will engage the forward edge of the latch member 153 as the card is being completely positioned for the printing operation. The use of the latch mechanism to hold the card slide in its final or operation position enables the card to properly settle into position immediately prior to initiating the printing operation. This arrangement or combination of operations tends to insure that there will be precise seating and optimum print operation upon each and every card that is properly positioned within the recorder.

It will be noted that the card 36 is notched or beveled at one corner, FIG. 7. If no provision is made within the recorder for rejecting the card in the event that it was improperly placed on the slide 115, i.e., if it was placed face upward instead of face downward, then the automatic movement of the slide 22 as described will, in cooperation with the card, cause a printing operation to be carried out on the card, as hereinafter described. It may be desirable to make provision to prevent a printing operation in such a case. To that end, the shim 116*b* may be provided with a forwardly extending projection 200 which should be configured to cooperate with the beveled corner of the card 36. The projection 200 as will be seen in FIG. 9, extends forwardly of the contactor 174 for the print switch 172. Accordingly, if the card is placed in any but the correct position in the recorder, then the notched or beveled portion of the card will be so located that the projection 200 intercepts a squared off corner of the card to thus prevent operation of the print switch. Under such circumstances, the latch member 153 will not have moved completely under the sear 151 of the trigger assembly so that the card slide will not be held in a latched position whereby the springs 134 and 136 will flex while the card is held between the plates 18 and 20 solely by virtue of the operation of the card seating solenoid 182. After the period of time defined by the timing circuit 190 (FIG. 11) expires, the transistors 196 and 198 cease to conduct such that the card seating solenoid 182 de-energizes, thus restoring the force of the spring 156, which returns the slide 22 to the position shown in FIG. 9. The downwardly extending operator 162 being in engagement with the leading edge of the card during the return of the slide 22 permits the slide to effect ejection of the card rom the recorder. It will be noted that as the spring 156 returns the slide forwardly, the arm 152 of the operator 148 engages the pin 122*b* such that the card seating pin 158 is rotated out of engagement with the edge of the card. The restoring force of the spring 156 should be sufficient to cause the trailing edge of the card 36 to be ejected or returned to position A. When the trailing edge of the card is approximately three-eighths of an inch from the opening between the plates 18 and 20 or, that is, at position D, as shown in FIG. 9, contactor 170 is restored in connection with the terminal 170*b* of the switch 168.

The following description deals with the situation where the card 36 is properly oriented in the opening between the plates 18 and 20 of the card chute assembly. Referring to FIG. 11 of the drawings, it will be noted that the contact 170*b* of the card seating switch 168 is connected directly to an input of an inverter 202 and the inverter is connected on its output to a reset input 204 of a NAND latch 206.

The latch 206, gate 210, and inverter 202 comprise together a print operation selector circuit composed in the preferred embodiment, of positive NAND logic. With the switch 168 in the position shown, the latch 206 is accordingly, in its reset condition for the reason that the contactor 170 is effective when made with the terminal 170*b* to send the reset input 204 of the latch to a low potential level, e.g., ground. As in the usual case, then, the latch is at a high potential level on a reset output 216.

The circuits are arranged to cooperate with a photocell assembly 218 comprising a lamp 220 and a photo transistor 222 only after the switch 168 has been operated such that the contactor 170 breaks with the terminal 170*b*. To this end, the assembly 218 is mounted, see FIGS. 8 and 9, relative to the opening between the plates 18 and 20 such that a black bar 50 printed in the position shown on the card 36 in FIG. 7 will interrupt the normal transmission of light from the lamp 220 to the photo transistor 222 after operation of the switch 168. As shown in FIG. 11, the collector of the photo transistor 222 is connected to the base electrode of a Darlington amplifier 224. The Darlington is connected by its collector to the regulated d.c. supply and its emitter electrode is connected through a load resistor 226 to ground. The emitter of the amplifier 224 is also connected to a second input 230 of the NAND gate 210. With these connections, so long as the photo transistor 222 receives light from the lamp 220, the base electrode of the Darlington 224 and hence, its emitter electrode will be at effective ground. The input 208 for the gate 210 is connected to a stationary terminal 174*b* of the print switch 172, and the terminal 174*b* is connected to ground through a resistor 234 having the sme value as the load resistor 226 for the Darlington amplifier 224. The movable contactor 174*a* of the print switch 172 is connected directly to the regulated d.c. supply such that when the switch is in its unoperated condition, the terminal 174*b* is connected through the contactor 174*a* to the positive supply. The potential thus established between the terminal 174*b* and ground is sufficient in and of itself to send the input 208 to the NAND gate 210 high. In a like manner, a positive potential on the emitter of the amplifier 224, i.e., a supply voltage established between the emitter and ground across the load resistor 226 is sufficient to, in and of itself, send the input 230 of the NAND 210 high.

With the operation of the card seating switch 168, the terminal 170*b* becomes open thus sending the output of the inverter 202 high such that the reset input to the latch 204 is high. At this time, however, the set output 214 of the latch is low and consequently, the reset output of the latch 216 will remain at a high potential level. After operation of the switch 168, if the photo transistor 222 responds to a bar 50, it will send the base and consequently the emitter of the amplifier 224 high such that the input 230 to the NAND gate 210 will go high. Input 208 of the NAND gate 210 will remain high until the print switch 172 is activated breaking the connection between contacts 174*a* and 174*b* of 172. Consequently, the input 212 for the latch 206 will be at a low potential to thereby send the set output 214 of the latch to a high potential level. Under these conditions, both inputs to the reset portion of the latch will be at a high potential to drive the reset output 216 to a low or zero potential level. It should be noted that operation of the print switch 172 removes the postiive d.c. potential from the terminal 174*b* such that after such operation, the input 208 to the NAND gate 210 cannot go high and the latch 206 cannot thereafter be set. Accordingly, the latch 206 can only be set during the interval between the operation of the card seating switch 168 and the operation of the card printing switch 172.

The reset output 216 of the latch is connected to a first input of a two input NAND gate 236, and the set output 214 is connected to one input of a second two input NAND gate 238. The other inputs for each of the gates 236 and 238 are connected in common to a pulse line 240 where the line is connected to receive pulses from a timing circuit comprised of a Unijunction Transistor (UJT) Time Delay Circuit 242 and a Pulse Forming Network 244. Time Delay Circuit 242 is comprised of a UJT circuit of the usual manner arranged to receive power and begin the timing cycle when Print Switch 172 is activated to connect movable contact 174a to contact 174c. The UJT circuit acts to deliver a positive pulse on line 243 at the end of its timing cycle. The Pulse Forming Network 244 is comprised of a Silicon Controlled Rectifier (SCR) 246, resistor 248, capacitor 280, resistor 282, diode 286, transistor 288 and resistor 290. In the normally unoperated condition, Print Switch 172 has its movable contact 174*a* connected to contact 174*b*. Thus contact 174*c* has no voltage source connected to it and is at ground potential. Consequently UJT circuit 242 and the anode circuit of SCR 246 are unpowered. The base of transistor 288 is driven through resistor 282 and diode 286 thus keeping the transistor turned on which keeps the collector and line 240 at ground potential. Upon activation of Print Switch 172 power is applied through contact 174*b* to the UJT circuit 242 and to the anode of SCR 246. Since SCR 246 is turned off, capacitor 280 is charged through resistor 248. The displacement current flows through diode 286 and the base of transistor 288. Since transistor 288 is already saturated this extra base current has no effect on the potential of line 240. At the end of its timing cycle the UJT circuit 242 fires. The pulse appearing on line 243 turns on SCR 246 dropping line 247 to ground potential. In the usual manner the potential of line 284 drops by the same amount as line 247 cutting off current flow through diode 286 and the base of transistor 288. Transistor 288 is therefore turned off and the potential of line 240 raises to the high logic level. Capacitor 280 is recharged through resistor 282 in the usual manner until the potential of line 284 raises sufficiently to turn transistor 288 back on, thus again lowering the potential of line 240. Thus it is shown that the duration of the high potential on line 240 is limited by the RC time constant of resistor 282 and capacitor 280.

Since the card is latched into place by latch 153 after operation of Pull Solenoid 182, the delay time of UJT circuit 242 may be of any duration but in this embodiment was chosen to give sufficient time for the card to settle into place. The pulse duration on line 240 was chosen to be of sufficient time to actuate print coil 266 or 268 as required.

Under the above conditions, one input for each of the gates 238 and 236 will go to a high potential level whenever the line 240 is pulsed and the inputs will remain at said level so long as the pulse persists on the line 240. Accordingly, the outputs of the gates 236 and 238 are solely determined by the condition of the outputs 214 and 216 of the latch 206, and the outputs of the gates 236 and 238 will change state only during the existence of a pulse on the line 240. At all other times, the outputs of both NAND gates are at a high potential level. The NAND gate 236 is connected through an inverter 248 to a first print operation signal line 250, and the NAND 238 is connected through a second inverter 252 to a second print operation signal line 254.

It should be apparent that the print operation signal lines 250 and 254 are normally at a low potential. The line 250 will be pulsed whenever the reset output 216 of the latch 206 is simultaneously high with a pulse on the line 240, and similarly, the line 254 is pulsed whenever the set output 214 of the latch 206 is simultaneously high with a pulse on the line 240. The line 250 is connected to a base electrode of a transistor current switch 256 where the switch is connected by its emitter to the base electrode of a transistor driver 258. Similarly, the second print operation signal line 254 is connected to the base electrode of a second transistor current switch 260 having its emitter connecter to drive the base of a transistor 262. Each of the switches 256 and 260 are connected to a positive current supply line 264 through current limiting resistors connected in their collector circuits. The transistor 258 is connected by its collector through a first print actuator electromagnet 266 to the supply line 264 and the transistor 262 is connected through second print actuator electromagnet 268 to the line 264. Accordingly, a pulse on the line 250 is effective to cause the transistor 256 to conduct in current saturation to thereby turn on the transistor 258 and energize the electromagnet 266. Similarly, a pulse on the line 254 is effective to cause the second print actuator electromagnet 268 to be energized. From what has been said, it will be seen that one of the electromagnets 266 or 268 is energized only so long as the timing circuit provides an output on the line 240. Further, the electromagnet 266 is operated as a result of a high potential level existing on the reset output of the latch 206 which potential exists by virtue of the photo transistor 222 seeing white, and the electromagnet 268 is operated by a high potential level output on the set output of the latch which occurs when the photo transistor sees a bar 50 between the operation of the card seating switch 168 and the operation of the print switch 172.

In order to prevent spurious activation of either the first print actuator electromagnet 266 or the second print actuator electromagnet 268 upon removal of electrical power from the Elapsed Time Recorder, means for clamping the potential on lines 250 and 254 at ground potential during the critical period after power removal has been provided. Zener diode 400 and resistor 402 conduct during normal operation maintaining transistor 406 in the on state and, consequently, transistors 408 and 410 in the off state. Upon removal of power from the Elapsed Time Recorder the voltage on the cathode of Zener diode 400 drops below the Zener voltage of the device. At this point base current drive to transistor 406 is removed and transistor 406 cuts off. Base current then flows through resistors 412 and 414 to transistor 408 which turns on and clamps the potential of line 254 to ground. Likewise base current through resistors 412 and 416 drives transistor 410 to maintain line 250 at ground potential. Transistors 408 and 410 are held on until the charge on the power supply filter capacitor drops below the critical level.

The first and second print actuator electromagnets 266 and 268 are physically located in the print actuator assembly 26 and is best seen in FIG. 2 of the drawings. The electromagnets are supported on a plate 270 in spaced apart relation relative to first and second print actuators 272 and 274 respectively. The plate 270 may be removably attached to the main support member 14 to serve as a bottom wall for such member, and the electromagnets are preferrably supported at angles relative to the vertical by brackets, the latter named members being supported by the plate 270.

Figure 12:
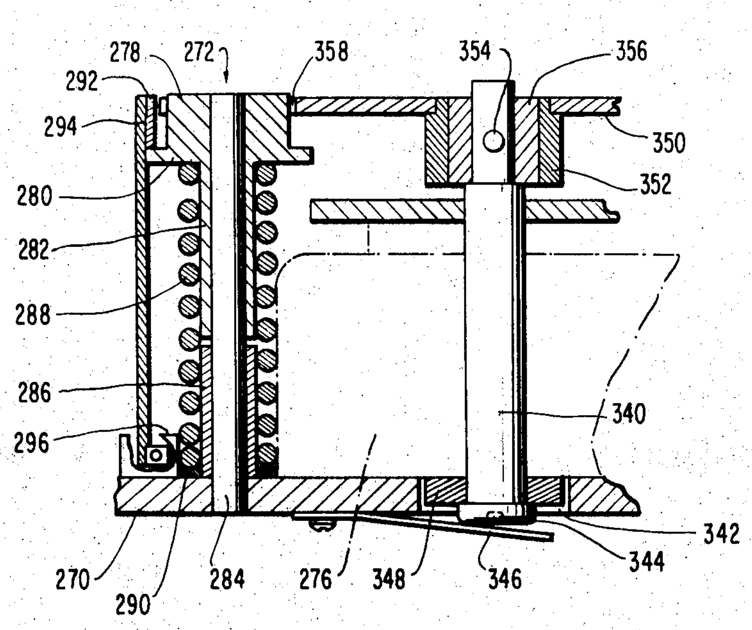
FIG. 12 is a detail sectional view in side elevation of a portion of the print actuating assembly employed to operate the printing assembly.

The first and second print actuators 272 and 274 are duplicates of each other, and they are physically located on opposite sides of a recock solenoid 276, which is supported on the plate 270. The first print actuator 272 is best seen in FIG. 12 of the drawings and a description of the parts of said actuator will suffice to describe the parts of the second print actuator. The actuator 272 comprises a cylindrical print hammer 278 which terminates at its lower end in a radially extending flange 280. The actuator 272 is also formed with an axially depending tubular projection 282 which is slidably mounted upon a vertically extending guide shaft 284 carried by the plate 270. The guide shaft 284 is supported in a fixed vertical position by the plate 270 such that it is coaxial with and spaced from the lift shaft 100. A print actuator stop member in the form of a collar or sleeve 286 is freely mounted upon the guide shaft 284 between the plate 270 and the tubular projection 282. The stop member is preferably spaced slightly from the tubular projection when the print actuator is in cocked or, that is, non-operating position. The stop member 286 and tubular projection 282 are disposed within a coil spring 288 that is interposed between the print hammer 278 and the plate 270. If desired, the spring may be seated on a suitable supporting or spacer member 290 that is resting on the upper surface of the plate 270. When the print actuator is in a nonoperated position, as shown in FIG. 2 and 12, the spring 288 is in a state of compression.

The first print actuator 272 is held in a nonoperated or cocked position by a trigger assembly which includes a sear 292 carried by one end of a trigger 294 that has its other end supported by suitable pivot mountings 296 located adjacent the base of the first print electromagnet 266 and the print operating spring 288. The trigger 294 is held by a bias spring 297 that is attached to the plate 270 so that the sear 292 will engage and retain the flange 280 of the print hammer 278. The trigger is made out of a magnetically attractable material. As previously stated, the second print actuator 274 is comprised of precisely the same type of parts employed for the first print actuator. Thus, a print hammer 298 is supported for sliding movement on a guide shaft 299. The shaft 299 is supported by the plate 270 such that it is coaxial with and spaced from the lift shaft 86. The print hammer 298 is held in the cocked position by a trigger assembly including a trigger 302, and a sear 304 where the sear engages a flange 306 of the print hammer. A second print operating spring 308 is compressed between the plate 270 and print hammer 298 when the actuator is cocked.

Figure 13:
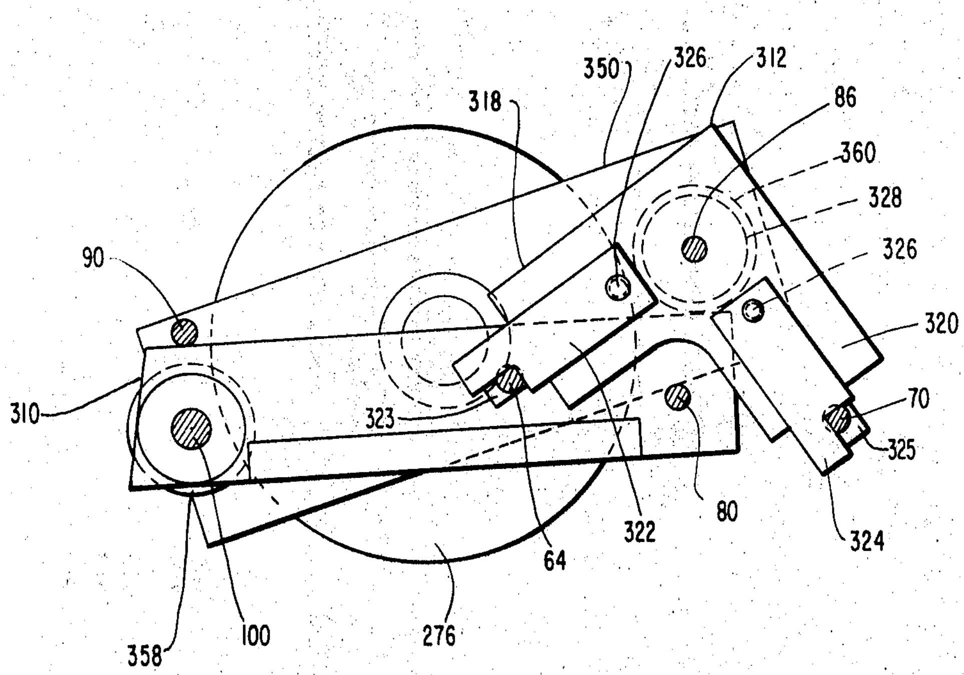
FIG. 13 is a plan detail view of the lift members forming a portion of the print actuating assembly.

The print hammers 278 and 298 are positioned directly below a pair of lift members 310 and 312 respectively; the said members are shown in FIGS. 2, 5, 6, and 13. The member 310 comprises essentially an angle bracket that is provided on its upper surface at one end thereof with a lock collar 314 within which the lift shaft 100 is firmly secured. In addition, the bracket 310 is also provided with a hole at its other end which hole is preferrably tapped to receive a lift screw 316. The screw extends from the upper surface of the member or bracket 310 and engages the lift shaft 80. The lift member 312 consists of an L shaped element having arms 318 and 320, FIG. 13, of equal dimensions. In the preferred embodiment of the invention the elapsed minutes shaft 64 and the elapsed seconds shaft 70, FIGS. 2, 4 and 13 are of a shorter length than the lift shaft 100 and the lower end portions of said shafts 64 and 70 are positioned in notches or cut-outs formed in the outer ends of clip members 322 and 324. The clip members 322 and 324 have flat elongated spring elements 323 and 325 positioned along the bottom surface thereof with the outer end portions of said spring elements engaging the lower ends of said shafts 64 and 70. The clip members 322 and 324 together with the spring elements 323 and 325 are secured to the upper or top surface of the arms 318 and 320 by screws 326. Thus the force delivered to the print hammers by way of the shafts 64 and 70 is delivered through the spring elements 323 and 325 engaging the lower ends of the shaft 64 and 70. The lift member 312 is provided with a downwardly depending lock collar 328 at the junction of the arms 318 and 320. The lift shaft 86 extends into the collar 328 and may be firmly secured therein, by suitable means, such as a set screw, not shown. From the foregoing description, it should be apparent that each of the lift members 310 and 312 float and are held in fixed vertical positions by virtue of being locked to the lift shafts 100 and 86 respectively. In the preferred embodiment, the elapsed time shafts are of shorter length than the lift shaft 100 such that the arms 318 and 320 are vertically spaced from the lift member or bracket 310.

Returning now to the operational description, it will be recalled that when the photo transistor 222 does not see a black bar 50 during the interval between operation of the card seating switch 268 and the print switch 172, the first print operation signal line 250 is pulsed when the switch 172 is operated. It will be noted that the switch 172 is operated before the card 36 is firmly seated against the rear end card guide 113*c*. This fact is of no operational importance for the reason that the card is actually seated before a print actuator is effective to lift the selected print pad containers whereby the printing pads will effect a recording on the card. When the line 250 is signaled, the first print electromagnet 266 is energized as described above and as a result of energization, attracts the trigger 294 so that the sear 292 is pulled away from the flange 280. The print hammer 278 is thereby released and it is driven by ts print operating spring 288 against the bottom of the lift member or bracket 310, thereby causing the member to be lifted. The member 310 upon being lifted effects the lifting of the shafts 100 and 80 such that the lift plates 102 and 74 are raised. From the description previously given, it should be evident that the raising of the plates 102 and 74 is effective to raise the print pad containers 108, 92, 88, 66, 72 and 76 such that the card is printed with the time of day; elapsed time dials; and first identification number 48 and bar 50 respectively.

In the event that the photo transistor 222 had seen a black bar during the proper interval, the second print signal line 254 would have been pulsed to actuate the second print electromagnet 268 as described. In such event, the trigger 302 is attracted to release the print hammer 298 under the force of the second print operating spring 308. The print hammer 298 engages the lock collar 328 of the lift member 312 causing the said member, and consequently, the elapsed time shafts 64 and 70 and the lift shaft 86 to be raised. It will be recalled that the elapsed time indicator pad containers are affixed to the upper ends of the shafts 64 and 70. Consequently, the containers are driven upwards by the shafts such that the print pads mark the card with the elapsed time indicators. It will also be recalled that the second identification number pad container 82 is supported by a lift member attached to the upper end of the shaft 86. Consequently, the container 82 is raised through the cooperation of the print hammer 298 and lift member 312 to effect the marking of the card with the second identification number.

Referring to FIG. 11, it will be noticed that the stationary terminal 174*c* of the print switch is connected by a line 330 to the input of a unijunction transistor (UJT) timing circuit 332. The said timing circuit is of the usual configuration, and causes a pulse to be generated at the output base electrode of the UJT after the time interval determined by the RC components connected to the emitter of the UJT. For the present invention, the time interval should be sufficiently long beyond the time interval of UJT circuit 242 to permit the print pads to make a distinct or optimum recording on the card 36.

The circuit 332 is connected by an output terminal 334, the output base of the UJT, to the base electrode of a transistor switch 336. The said switch like the transistors 256 and 260, is connected by its collector to the d.c. supply line 264, and it is connected by its emitter to the input base electrode of a transistor driver amplifier 238. The driver amplifier 238 comprises a pair of transistors connected in a Darlington configuration, and its common collector is connected to the supply line 264 through the recock solenoid 276. Accordingly, solenoids 276 and 300 are pulse energized after the energization of an electromagnet 266 or 268 and they are energized in a similar manner.

In the preferred embodiment of the invention, the time constants of the timing circuit 190, FIG. 11, for the card seating solenoid 182 are shorter than those of the timing circuit 332 for the activation of the recocking solenoid 276. Consequently, the card seating solenoid deenergizes before the print pads are retracted and the card is retained in place solely by virtue of the engagement of the latch member 153 with sear 151. Since the card is held in place, the slide 22 must be held at its rearmost position.

Referring to FIGS. 2, 12, and 13, the recock solenoid 276 is provided with a vertically movable armature 340. The armature projects through both ends of the solenoid 276 with the lower end of the armature also extending through a clearance hole 342 in the plate 270. The lower end of the armature 340 has a screw 344 axially secured therein which is engaged by an end of a leaf spring 346 that is attached to the bottom surface of the plate 270. The spring is effective to urge and hold the armature in an upper position with respect to the plate 270. It may be found desirable to interpose a washer 348 in the hole and between the screw 344 and the bottom of the recock solenoid. A recocking plate 350 is mounted on a collar 352 that is pivotably supported by a pin 354, upon the upper end portion of the recock armature 340. A resilient bushing or member 356 may be interposed between the armature 340 and the collar 352 to stabilize the recock plate 350 in a horizontal plane. The plate 350 is generally rectangular in shape and is provided with clearance holes 358 and 360 at its respective end portions, FIGS. 12 and 13. The plate is supported by the armature 340 when the armature is in its uppermost position such that the print hammers 278 and 298, FIG. 2, extend into and through the holes 358 and 360 respectively. The diameter of each of the holes should be such that the flanges on the print hammer cannot pass therethrough and the plate 350 should be spaced vertically above the flanges.

When the recock solenoid 276 is pulsed as described, the armature 340 moves downwardly against the leaf spring 346 until the recock plate engages the flange of the operated print hammer; assuming operation of the print hammer 278, the plate will engage flange 280 first since the hammer 278 is vertically higher than the second print hammer 298. The recock plate pivots around the pin 354 until it engages the flange of the print hammer 298. Accordingly, as the plate 350 descends, it exerts a differential recocking force on the two print hammers. However, downward movement of the hammer 298 is limited by its stop member. The print hammer is lowered by this action until its tubular projection 282 engages its stop member 286. When the print hammer 278 is in its lowermost position, the sear 292 for its trigger assembly re-engages the flange 280 for the reason that the timing circuits are designed such that the electromagnet 266 de-energizes before the recock solenoid is energized and the trigger is therefore restored by the spring 297 to its non-operated position. The sear should be shaped such that it is cammed outwardly by the flange 280 as the print hammer descends to the cocked position.

As the operated print hammer is recocked, the operated lift plate 310 free falls from its lifted position thus disengaging the print pads from the card 36. Referring to FIG. 5, it may be desirable to interpose a spring 362 between the top surface of the lift member 312 and the bottom surface of the clockwork plate 30. If this is done, when the member 312 is raised by the print hammer 298, the spring 362 will be compressed. When the print hammer is recocked, the compressed spring will provide a positive downwardly directed force for the member 312, and it, in turn, will provide a positive return for the elapsed time shafts if they are engaged by the clips 322 and 324. A positive return as described may be deemed desirable particularly if the print pads have any tendency to stick to the card. A similar spring return can be provided for the member 310, and a clip for engaging the minutes shaft 90 may be supported by the plate 310.

Actuator electromagnet 300 releases latch 153 to allow the card to exit from the read station. This occurs upon activation of cock solenoid 276 since actuator electromagnet is parallel to cock solenoid 276 and is driven by Darlington Transistor Pair 238.

The card is ejected from the card chute assembly in generally the same manner as described above. It will be noted that as the card moves out of the chute assembly, the switch contactors 174 and 170 restore the card print and card seating switches respectively and in the stated order. The printing, recock, and ejection operations should be timed such that the print switch is normally restored prior to the generation of a second recock pulse by the UJT time 332. As the card seating switch restores, the input to the inverter 202 (FIG. 11) goes high to thereby reset the latch 206.

The embodiment of the invention disclosed above was described as being a time recorder particularly useful for producing records on a telephone toll card. It should be obvious that the said recorder may be modified to produce time records of the type used in industrial accounting, i.e., those used for pay purposes among other things. Further, although a particular form of logic circuitry was described, those skilled in the art will be aware that they need not be held to the form of logic, i.e., it may be desired to employ other positive or, indeed, it may be desirable to employ negative logic.

I claim:

1. In a record receiver device having a chute assembly with a slot therein, a plate member supported on siad chute assembly for reciprocatory movement with respect thereto, a record receiver manually insertable into the slot in said chute assembly with an end thereof engaging said plate member for initiating manual movement of said plate member away from said slot, a plurality of marking elements carried by said device and arranged to project through an opening in said chute assembly for engaging said record receiver, a switch mechanism actuated by the initial movement of said plate member for energizing means to cause said plate member to be moved further away from said slot and means on said plate engaging the other end of said record receiver to draw same through said slot and completely into said chute assembly.

2. In a record receiver device as set forth in claim 1, wherein said device is provided with a second switch mechanism engaged by said plate member for actuating said marking elements to perform at least one marking operation upon said record receiver.

3. In a record receiver printing device having a chute assembly with slot therein, a plate member supported on said chute assembly for reciprocatory movement with respect thereto, a record receiver manually insertable into the slot in said chute assembly with an end thereof engaging said plate member for initiating manual movement of said plate member away from said slot, a plurality of printing elements carried by said device and arranged to project through an opening in said chute assembly for engaging said record receiver, a switch mechanism actuated by the initial movement of said plate member for energizing means to cause said plate member to be moved further away from said slot and means on said plate engaging the other end of said record receiver to draw same through said slot and completely into said chute assembly.

4. In a record receiver printing device as set forth in claim 3, wherein said device is provided with a second switch mechanism engaged by said plate member for actuating said printing elements to perform at least one marking operation upon said record receiver.

5. In a record receiver printing device as set forth in claim 3 wherein said last named means includes a pair of resilient elements carried by said plate member and arranged to terminate in hooked end portions for engaging the trailing end of the record receiver in said slot for automatically forcing said record receiver through said slot and into said chute assembly.

6. In a record receiver printing device as set forth in claim 5, wherein said chute assembly is provided with a fixed member arranged to overlie said resilient elements for camming the hooked end portion of said resilient elements into engagement with the trailing end of said record receiver.

7. In a record receiver printing device as set forth in claim 3 wherein said chute assembly is provided with a fixed member arranged to overlie said resilient elements, an extensible flexible member connected to said fixed member and said plate member, said switch mechanism connected to a timing circuit in said device, said extensible flexible member after the passage of a predetermined time interval causes said plate member to move towards said slot to effectively eject the trailing end of said record receiver through said slot to permit the manual removal of the record receiver from said chute assembly.

8. In a record receiver printing device as set forth in claim 3 wherein said printing elements make a printing upon said record receiver upon its initial insertion into said chute assembly which includes an identification number and symbol and means associated with said printing elements for scanning said record receiver upon its being inserted into said chute assembly a second time to read said symbol and generate a signal for actuating the printing elements to make a second printing upon the record receiver.

9. A device for producing records upon a record receiver comprising a support frame having a pair of plate members mounted thereon in spaced parallel relation to one another to define therebetween a chute, said plate members each having a slot formed therein adjacent an end thereof, said lower plate member having a slotted shaped area formed therein, an elongated reciprocatory member carried by said support frame in super-imposed relation to said pair of plate members, said reciprocatory member having a depending end projecting into said slot in said plate members, a record receiver manually inserted into said chute and engaging said depending end of said reciprocatory member, a plurality of marking elements mounted on said support frame and arranged to engage said record receiver in said slotted shaped area, said reciprocatory member having means thereon overlying a portion of said upper plate for engaging said record receiver and drawing same completely into said chute contemporaneous with conveying said record receiver to a position overlying said slotted shaped area and said marking elements, and said marking elements imparting at least one recording upon said record receiver in response to the movement of said record receiver within said chute.

10. In a device as set forth in claim 9 wherein said marking elements have means associated therewith for ejecting the record receiver from said chute, said means becoming effective subsequent to the commencement of the marking operation and after the passage of a predetermined time interval.

11. In a device as set forth in claim 9 wherein a record receiver sensing means is provided which is responsive to a marked record receiver to selectively energize said apparatus to perform at least one more marking operation upon said record receiver.

12. In a device as set forth in claim 9 wherein said device includes an electronic marking actuator means for selectively signalling a marking electromagnet to effect a marking operation on said record receiver by said marking elements.

* * * * *